US011260389B2

(12) United States Patent
Wright et al.

(10) Patent No.: US 11,260,389 B2
(45) Date of Patent: Mar. 1, 2022

(54) DISPOSABLE DIAGNOSTIC DEVICE WITH VENTED PRIMING FLUID PASSAGE FOR VOLUMETRIC CONTROL OF SAMPLE AND REAGENTS AND METHOD OF PERFORMING A DIAGNOSIS THEREWITH

(71) Applicant: WI, INC., Centennial, CO (US)

(72) Inventors: David W. Wright, Littleton, CO (US); Peter W. Kroehl, Denver, CO (US); Paul S. Wright, Denver, CO (US)

(73) Assignee: CREGANNA UNLIMITED COMPANY, Galway (IE)

( * ) Notice: Subject to any disclaimer, the term of this patent is extended or adjusted under 35 U.S.C. 154(b) by 323 days.

(21) Appl. No.: 16/587,869

(22) Filed: Sep. 30, 2019

(65) Prior Publication Data

US 2020/0023352 A1 Jan. 23, 2020

Related U.S. Application Data

(62) Division of application No. 15/648,266, filed on Jul. 12, 2017, now Pat. No. 10,427,152.

(Continued)

(51) Int. Cl.

*G01N 35/00* (2006.01)
*G01N 1/10* (2006.01)

(Continued)

(52) U.S. Cl.

CPC ......... *B01L 3/502* (2013.01); *B01L 3/502715* (2013.01); *B01L 3/502738* (2013.01);

(Continued)

(58) Field of Classification Search

CPC ............... B01L 3/502; B01L 3/502768; B01L 3/502746; B01L 2200/0605; B01L 7/00;

(Continued)

(56) References Cited

U.S. PATENT DOCUMENTS

| | | | | |
|---|---|---|---|---|
| 2009/0215072 A1* | 8/2009 | McDevitt | G01N 33/56972 435/7.1 |
| 2013/0331298 A1* | 12/2013 | Rea | C12Q 1/6844 506/16 |

(Continued)

*Primary Examiner* — Brian J. Sines

(57) ABSTRACT

A diagnostic cartridge and method of performing a diagnostic test are provided. The cartridge includes a body having a sample chamber for receipt of a sample, an analysis chamber, and a reagent-containing dispensing member. A valve member is coupled to the body for selective movement between first and second states. The valve member has a fluid passage with a hydroscopic, gas permeable vent. In the first state, the fluid passage is out of fluid communication with the sample chamber and is registered for fluid communication with the reagent-containing dispensing member. The vent prevents fluid from passing therethrough and allows air to vent therefrom as reagent flows into and fills the fluid passage. In the second state, the fluid passage remains in fluid communication with the reagent-containing dispensing member and is brought into fluid communication with the sample chamber to facilitate transporting the sample to the analysis chamber.

5 Claims, 9 Drawing Sheets

Related U.S. Application Data

(60) Provisional application No. 62/361,121, filed on Jul. 12, 2016.

(51) Int. Cl.
*A61J 1/06* (2006.01)
*B01L 3/00* (2006.01)
*B01L 7/00* (2006.01)

(52) U.S. Cl.
CPC . *B01L 2200/026* (2013.01); *B01L 2200/0605* (2013.01); *B01L 2200/0621* (2013.01); *B01L 2200/0684* (2013.01); *B01L 2200/0689* (2013.01); *B01L 2200/16* (2013.01); *B01L 2300/0627* (2013.01); *B01L 2300/0672* (2013.01); *B01L 2300/0816* (2013.01); *B01L 2300/0838* (2013.01); *B01L 2300/0877* (2013.01); *B01L 2300/0883* (2013.01); *B01L 2300/0887* (2013.01); *B01L 2400/0481* (2013.01); *B01L 2400/065* (2013.01); *B01L 2400/0633* (2013.01); *B01L 2400/0683* (2013.01)

(58) Field of Classification Search
CPC . B01L 3/00; C12Q 1/68; G01N 35/00; G01N 1/10; A61J 1/06
See application file for complete search history.

(56) References Cited

U.S. PATENT DOCUMENTS

| | | | | |
|---|---|---|---|---|
| 2016/0346778 | A1* | 12/2016 | Wright | B01L 3/502 |
| 2018/0015474 | A1* | 1/2018 | Arlett | B01L 3/527 |

* cited by examiner

DISPOSABLE DIAGNOSTIC DEVICE WITH VENTED PRIMING FLUID PASSAGE FOR VOLUMETRIC CONTROL OF SAMPLE AND REAGENTS AND METHOD OF PERFORMING A DIAGNOSIS THEREWITH

CROSS-REFERENCE TO RELATED APPLICATION

This application is a divisional application of U.S. application Ser. No. 15/648,266, filed Jul. 12, 2017, which claims the benefit of U.S. Provisional Application Ser. No. 62/361,121, filed Jul. 12, 2016, both of which are incorporated herein by way of reference in their entirety.

BACKGROUND

1. Technical Field

This invention relates generally to in-vitro diagnostics, and more particularly to disposable diagnostic cartridges and apparatus and methods for controlling volume of the sample and reagents to be assayed.

2. Related Art

Diagnostic tests are increasingly being used to determine the state or condition of a biological environment, such as in human healthcare, agriculture, livestock management, municipal systems management, and national defense, by way of example and without limitation. A new market is emerging wherein diagnostic tests are being performed at the point-of-care. The diagnostic test can be complex, requiring multiple fluids and multiple steps to execute an assay. An assay is a sequence of steps or procedures used to measure the presence or absence of a substance in a sample, the amount of a substance in a sample, or the characteristics of a sample. An example of a common and relatively simple point-of-care assay, which can be readily conducted by a layperson, is a blood glucose test. In this test, generally speaking, the blood is mixed with glucose oxidase, which reacts with the glucose in the sample, creating gluconic acid, wherein the gluconic acid reacts with a chemical, typically ferricyanide, producing ferrocyanide. Current is passed through the ferrocyanide and the impedance reflects the amount of glucose present.

Although the aforementioned blood glucose assay is relatively common and simple, many assays are far more complex in that they require specific fluids, often of differing types and quantities, to be mixed with a known sample size and distributed in controlled volumes in order to provide quantitative test results, rather than simply qualitative results. These fluids may be, but are not limited to, a buffer solution for dilution, fluids containing antibodies and antigens, microspheres coated with binding agents, cell lysing agents, and other fluids required to manipulate the sample being tested. Diagnostic tests that utilize millifluidic and microfluidic volumes of the fluids are intended to provide an incredibly high degree of specificity, sensitivity, and a precise volume and rate of fluid delivery to achieve as accurate a test result as possible. Nearly all microfluidic tests require the introduction of fluids, control of flow, mixing of fluids and other interactive functions throughout the assay sequence to manipulate the sample being tested and to produce an accurate diagnosis.

Typically, consumable diagnostic devices, meaning the diagnostic device is disposable upon being used, require a companion durable hardware device that interfaces with the consumable diagnostic device to execute the test. The durable hardware performs many functions, one of which is to facilitate transfer the fluids into microfluidic or millifluidic channels formed within the consumable diagnostic device. The introduction of the fluids to the reaction chamber requires precision; including flow rate, volume and timing, so as to best attempt to replicate the laborious protocols of a laboratory, where precession pipettes are employed to obtain quantitative results. Obtaining quantitative test results continues to prove challenging in point-of-care diagnostic devices, and expensive, given the need for the durable hardware. Two challenges common to all assays are the need to control sample collection sizes and maintain precise mixing ratios without loss of sample targets being measured.

SUMMARY OF THE INVENTION

In accordance with one aspect of the invention, a single-use, consumable diagnostic cartridge is provided having a translatable valve member including a vented fluid priming passage configured for selective fluid communication with a sample receiving chamber having a fixed capillary volume.

In accordance with another aspect of the invention, translated actuation of the valve member causes a precise volume of a fluid sample within the sample receiving chamber to be segmented from the total sample population, whereupon the segmented fluid sample is brought into fluid communication with fluid contained within the vented fluid priming passage such that fluid within the vented fluid priming passage can be selectively urged to carry the fluid sample to a detection/analysis chamber.

In accordance with another aspect of the invention, an air vent can be provided to allow venting of air outwardly from the detection/analysis chamber, thereby allowing the detection/analysis chamber to contain only a mixture of the fluid and the fluid sample.

In accordance with another aspect of the invention, the total volume of fluid of the sample receiving chamber is predetermined and fixed and the total volume of fluid in the fluid passage is predetermined and fixed, thus providing a precisely controlled volume of a fluid sample and fluid mixture in the detection/analysis chamber.

In accordance with another aspect of the invention, a disposable diagnostic device is provided. The disposable diagnostic device includes a body having a sample receiving chamber, configured for receipt of a fluid sample, and an analysis chamber. A rupturable fluid dispensing member is operably fixed to the body and contains a fluid therein. A valve member is coupled to the body for selective translatable movement from a first state to a second state. The valve member has a fluid passage extending between an inlet and an outlet with a hydroscopic, gas permeable first vent covering at least a portion of the fluid passage. The fluid passage is out of fluid communication with the sample receiving chamber and in fluid communication, upon the fluid dispensing member being ruptured, with the fluid in the fluid dispensing member while in the first state. The first vent prevents fluid from passing therethrough and allows air to vent outwardly from the fluid passage while a priming volume of the fluid flows from the fluid dispensing member, through the outlet and into the fluid passage in the first state. The outlet of the fluid passage is brought into fluid communication with the sample receiving chamber and the inlet is brought into fluid communication with the rupturable fluid dispensing member in the second state to allow the priming volume of fluid within said fluid passage to transport the fluid sample to the analysis chamber.

In accordance with another aspect of the invention, the valve member is linearly translatable between the first state and the second state.

In accordance with another aspect of the invention, the body has an outer periphery and the valve member is configured to translate along the outer periphery.

In accordance with another aspect of the invention, the outer periphery has a flange and the valve member has a plurality of fingers coupled about the flange for slidable translation therealong.

In accordance with another aspect of the invention, a hydroscopic, gas permeable second vent is provided to allow air to vent outwardly from the analysis chamber.

In accordance with another aspect of the invention, the rupturable fluid dispensing member is free of any predefined opening.

In accordance with another aspect of the invention, the rupturable fluid dispensing member is compliant.

In accordance with another aspect of the invention, at least one seal member can be provided to form a fluid tight seal between the inlet and the body and between the outlet and the body.

In accordance with another aspect of the invention, the at least one seal member can include separate annular seal members, with a separate one of the seal members being disposed between the inlet and the body and between the outlet and the body.

In accordance with another aspect of the invention, the at least one seal member is configured to translate along the body in sealed relation therewith while the valve member translates from the first state to the second state.

In accordance with another aspect of the invention, the sample receiving chamber extends between a sample inlet and a sample outlet, wherein the sample outlet is configured to facilitate the formation of a controlled volume meniscus of the fluid sample adjacent the analysis chamber.

In accordance with another aspect of the invention, the at least one seal member is configured to remove a meniscus of the fluid sample formed at the sample inlet as the valve member is translated from the first state to the second state.

In accordance with another aspect of the invention, the sample receiving chamber can be formed via a capillary tube.

In accordance with another aspect of the invention, the first vent extends between the inlet and the outlet to form at least a portion of a length of the fluid passage.

In accordance with another aspect of the invention, the valve member can have a convex surface extending between the inlet and the outlet, with the first vent being fixed to the convex surface to form a portion of the fluid passage.

In accordance with another aspect of the invention, a method of performing a diagnostic test on a fluid sample via a disposable diagnostic cartridge is provided. The method includes, introducing a sample into a sample receiving chamber of the disposable diagnostic cartridge; rupturing a fluid-containing blister of the disposable diagnostic cartridge; urging fluid to flow from the fluid-containing blister into a fluid passage of a translatable valve member while the translatable valve member is in a first state and causing air to evacuate the fluid passage; translating the valve member to a second state and bringing the fluid within the fluid passage into fluid communication with the sample; and urging the fluid within the fluid passage to transport the sample to an analysis chamber of the disposable diagnostic cartridge.

In accordance with another aspect of the invention, the method can further include automatically forming a controlled volume meniscus of the sample at a sample outlet of the sample receiving chamber upon introducing the sample into the sample receiving chamber.

In accordance with another aspect of the invention, the method can further include translating the valve member linearly from the first state to the second state along an outer periphery of the disposable diagnostic cartridge.

In accordance with another aspect of the invention, the method further includes filling the fluid passage of the translatable valve member entirely with the fluid from the fluid-containing blister prior to translating the valve member to the second state.

In accordance with another aspect of the invention, the method further includes venting any air within the fluid passage of the valve member outwardly therefrom prior to translating the valve member to the second state.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
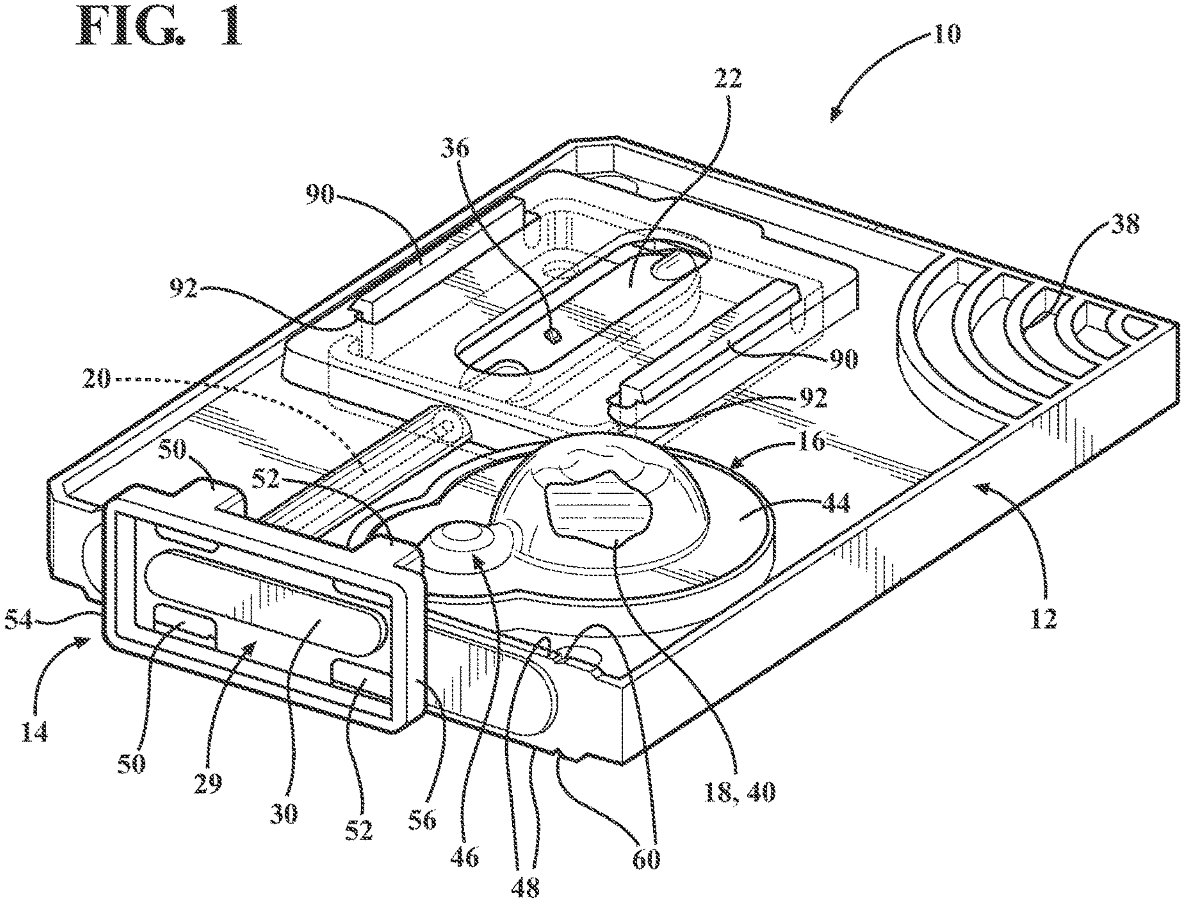
FIG. 1 is an isometric view of a diagnostic cartridge constructed in accordance with one aspect of the disclosure.

Referring in more detail to the drawings, FIG. 1 illustrates a disposable diagnostic cartridge, referred to hereafter as cartridge 10, constructed in accordance with one aspect of the invention for performing qualitative and quantitative analysis on a controlled volume specimen. As shown in the several Figures, the cartridge 10 has a main body 12, a translatable valve member 14 operably coupled to the main body 12, referred to hereafter simply as body 12, and a rupturable fluid dispensing member, such as a flexible, compliant blister 16 containing a desired fluid 18 therein operably fixed to the body 12.

Figure 2:
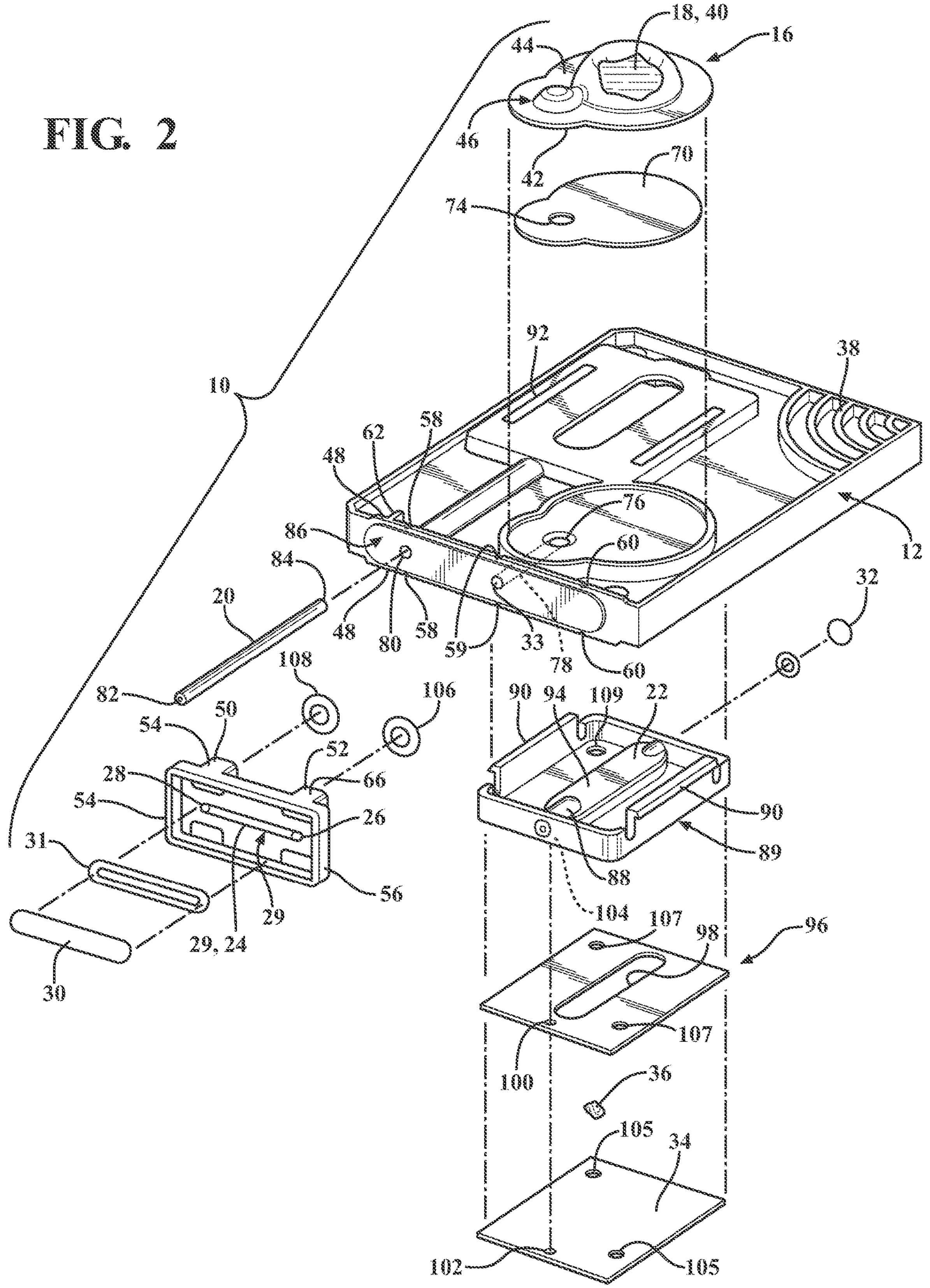
FIG. 2 is an exploded view of the diagnostic cartridge of FIG. 1.
Figure 3A:
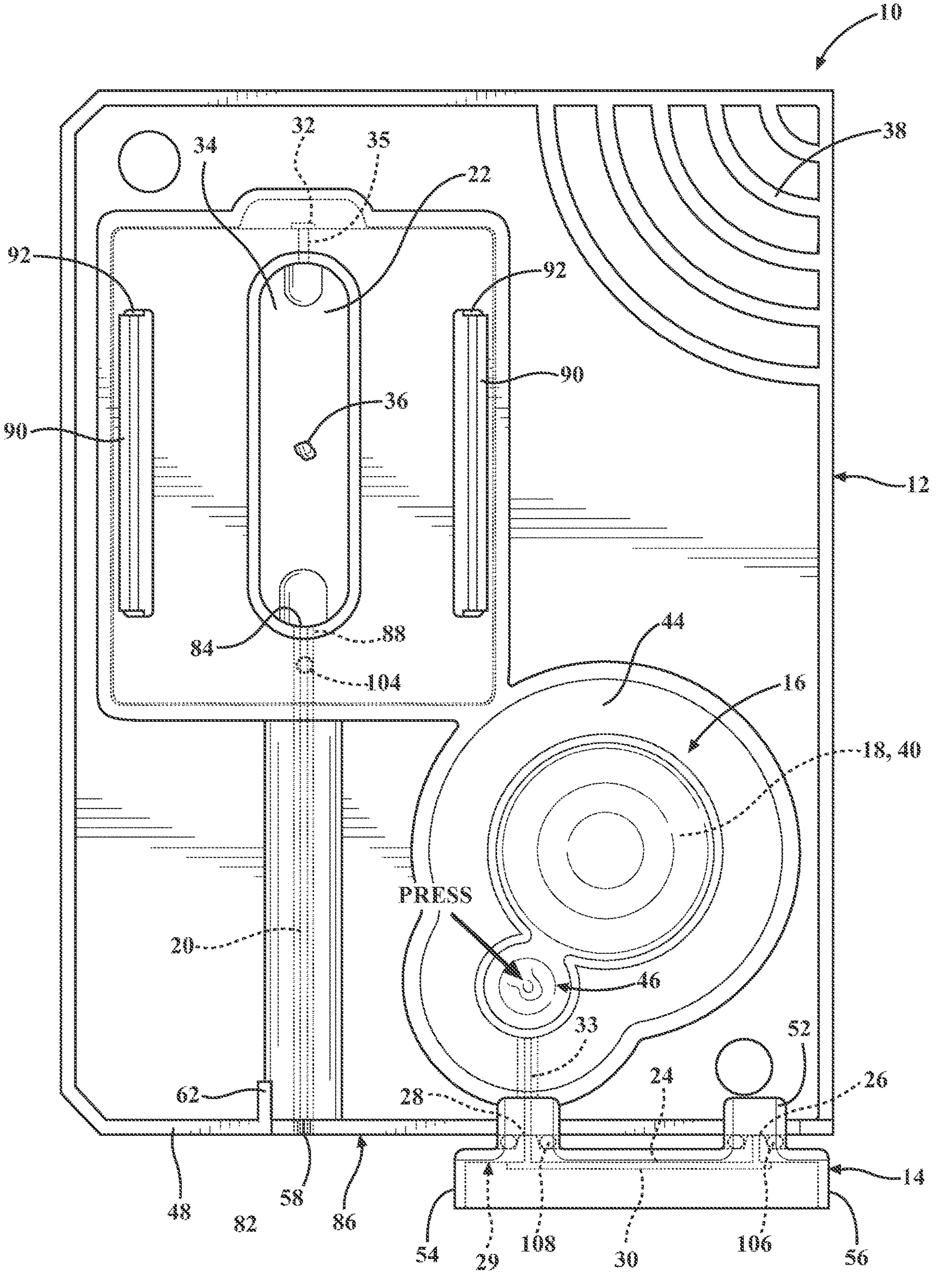
FIG. 3A is a plan view of the diagnostic cartridge with a valve member thereof shown in an unactuated, first state.
Figure 3B:
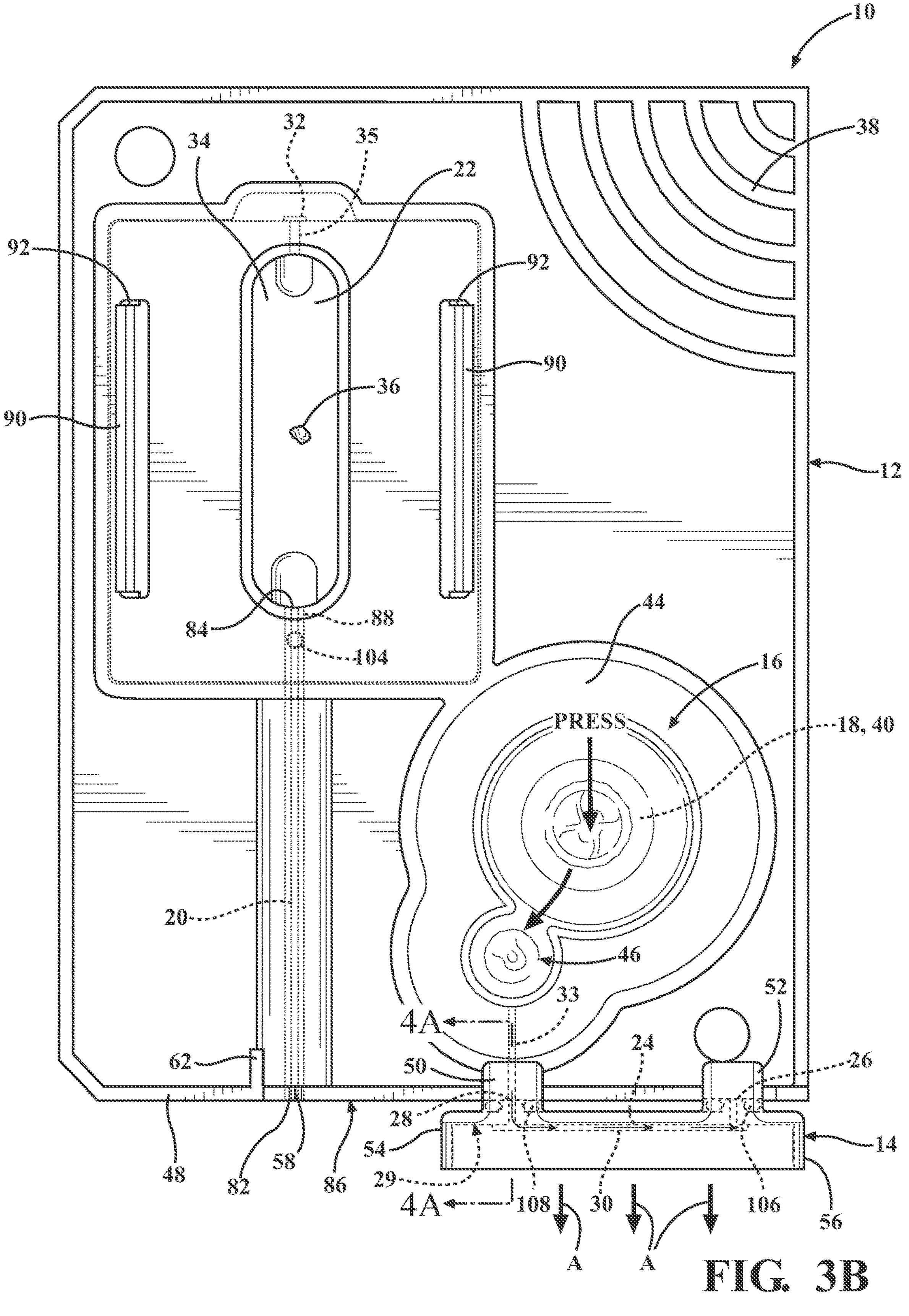
FIG. 3B is a view similar to FIG. 3A, with a fluid-containing blister of the diagnostic cartridge having been opened and fluid therefrom being introduced into a fluid passage of the valve member while in the unactuated, first state.

The body 12 has a sample chamber 20 configured for receipt of a fluid sample S and an analysis chamber 22. The valve member 14 is coupled to the body 12 and is operable to be selectively translated to move between a first unactuated, closed priming state (FIGS. 3A-3C) to a second actuated open state (FIG. 3D-3F). The valve member 14 has a fluid passage 24 extending between an inlet 26 and an outlet 28 with a hydroscopic, gas permeable first vent 30 covering and establishing at least a portion of the fluid passage 24. The fluid passage 24 is out of fluid communication with the sample chamber 20 and in fluid communication, upon the blister 16 being ruptured, with the fluid 18 in the blister 16 while in the first state. While in the first state, and while the fluid 18 flows into the fluid passage 24, the first vent 30 prevents the fluid 18 from passing therethrough, as a result of being hydrophobic, and allows air to vent freely outwardly from the fluid passage 24. As the fluid 18 fills the full volume capacity of the fluid passage 24, a priming volume of the fluid 18, equal to the full volume capacity of the fluid passage 24, flows from the blister 16 through the outlet 28 into the fluid passage 24. Accordingly, while in the first state, the fluid passage 24 is able to be readily primed to contain a precisely controlled prime volume of the fluid 18, with no air, such as bubbles, being present in the fluid 18. It is to be recognized that the amount of fluid 18 able to be primed into the fluid passage 24 is precisely controlled by the volume defined by the fluid passage 24, which, as best shown in FIGS. 2 and 4A, is further defined by the available volume between an upper surface 29 of the valve member 14 and the first vent 30, wherein the first vent 30 is fixed to the upper surface 29, such as via an annular adhesive film 31.

The outlet 28 of the fluid passage 24 is brought into fluid communication with the sample chamber 20 and the inlet 26 is brought into fluid communication with the blister 16, via an outlet port 33 extending from the blister 16, upon the valve member 14 being selectively translated to the second state (FIG. 3D). While in the second state, the precise volume of the priming volume of fluid 18 within the fluid passage 24, free of any air, is able to be readily displaced under fluid pressure via further actuation of the blister 16, whereupon the priming volume of fluid 18 transports the fluid sample S to the analysis chamber 22 for subsequent analysis (FIG. 3E). To facilitate flow of the mixture of the fluid 18 and the sample S into the analysis chamber 22, gas downstream from the mixture can be vented through a second vent 32 provided via a second fluid impervious, hydroscopic membrane. The second vent 32 is shown as being disposed on a wall of the sample chamber 20, with gas being free to flow outwardly from the analysis chamber 22 via an exit port 35 and through the second vent 32. Upon being received in the sample chamber 20, the fluid 18 and sample S mixture can be mixed via a mixing member 36 configured to circulate randomly within the sample chamber 20 to form a homogenous mixture M of the fluid 18 and sample S (FIG. 3F), whereupon the sample S can be analyzed for a variety of factors, such as number of neutrophil cells, or otherwise. The analysis can be performed through a clear region, such a clear window 34 of the sample chamber 20 to allow an analysis to be performed on the homogenous sample mixture.

The main body 12 is constructed of any suitable rigid material, and is preferably formed of a molded plastic material to allow economic construction of the intricate details thereof, though it is contemplated that other forms of manufacture and materials could be used. The main body 12 can be provided with a cartridge grip 38 to facilitate holding the cartridge 10 during use.

The blister 20 is formed of any suitable flexible material or materials to bound and encapsulate a dispensing reservoir 40 of a predetermined volume. The dispensing reservoir 40 contains a predetermined volume of the sealed fluid reagent, simply referred to as fluid 18, therein, or it could be air, depending on the nature of the test to be performed. The fluid 18 contained in dispensing reservoir 40 can be of any desired type of fluid, again depending on the nature of the test to be performed, including an inactive, non-reactive fluid, such as water, for example, or an active, reactive fluid, such as a reagent capable of lysing a cell. The blister 16 can be provided having a bottom layer or surface 42 formed without any predefined valve, opening or otherwise, and an upper layer 44. The lower and upper layers 42, 44 can be bonded to one another about their respective out peripheries via any suitable bonding process upon disposing the fluid 18 therebetween, such as a suitable welding or adhering process to contain the fluid 18 therein. Though the bottom surface 42 is described as being valve or opening free, it is contemplated that a predefined valve or opening could be formed in the bottom surface 42, if desired, though not necessary as a result of an opening mechanism 46 contained within or adjacent a portion of the blister. The opening mechanism 46 can be formed via a small piercing or rupturing member, such as a spherical member, similar to a bb typically used in a bb style gun, though the spherical member can be smaller than a standard bb, depending on the size of the blister 16. Those skilled in the art will ready appreciate that by depressing (applying a pressing force downwardly thereon) the opening mechanism 46, the piercing or rupturing member can be caused to form an opening in the readily rupturable or piercable lower layer 42, thereby allowing the fluid 18 to flow outwardly therefrom under pressure. The upper layer 44 can be formed of the same type of material as the lower layer 68, or from a different type of material, as desired, though it is to be recognized that the upper layer 44 is not intended to be ruptured or torn during deployment. The upper layer 44 is sufficiently sized to allow the fluid 18 disposed therein to create a bulbous, expanded portion bounding the reservoir 40, wherein the upper layer 44 is flexible and tough, thereby allowing the bulbous portion to be selectively depressed and actuated as desired.

In construction, the cartridge 10 can be formed of separately made components that are subsequently assembled to one another. For example, the valve member 14 can be constructed for sliding attachment to the body 12. To facilitate the sliding attachment, the body 14 has opposed flanges 48 extending laterally away from one another, wherein the flanges 48 are sized and configured for receipt of opposed, generally J-shaped pairs of fingers 50, 52 extending from the valve member 14. One pair of opposed fingers 50 are adjacent one end 54 of the valve member 14 and another pair of the opposed fingers 52 are adjacent an opposite end 56 of the valve member 14. To facilitate positioning the valve member 14 in the unactuated first state (FIGS. 3A-3C) and the actuated second state (FIGS. 3D-3F), the flanges 48 can be provided having pairs of opposed notches 58, 59, 60 and a positive stop member or rib 62 and the fingers 50, 52 can be provided having respective outwardly extending detents or protrusions 64, 66 sized for snapping receipt in the notches 58, 59, 60. When in the unactuated first state, the protrusions 64 are snapped into the notches 59 and the protrusions 66 are snapped into the notches 60, and when in the actuated second state, the protrusions 64 are snapped into the notches 58 and the protrusions 66 are snapped into the notches 60. To further facilitate assurance that the valve member 14 is properly positioned in the actuated second state, the fingers 50 are brought into a positive or hard stop relation with the ribs 62 (FIGS. 3D-3F).

Figure 4A:
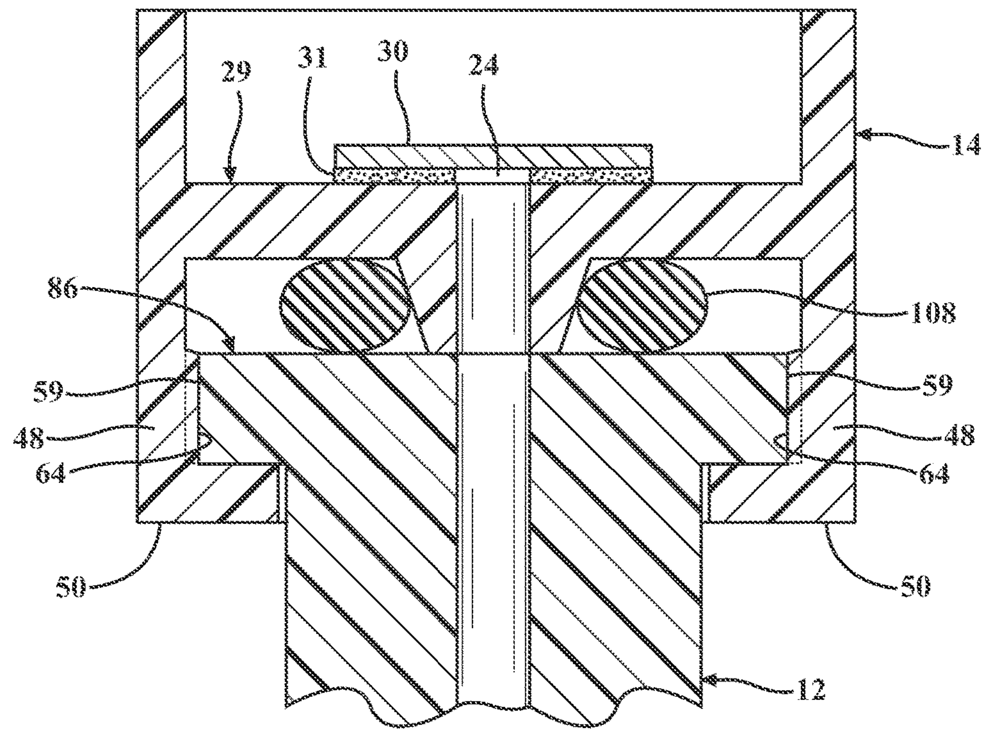
FIG. 4A is an enlarged, fragmentary cross-sectional side view of a valve member of a diagnostic cartridge constructed in accordance with one aspect of the disclosure.
Figure 4B:
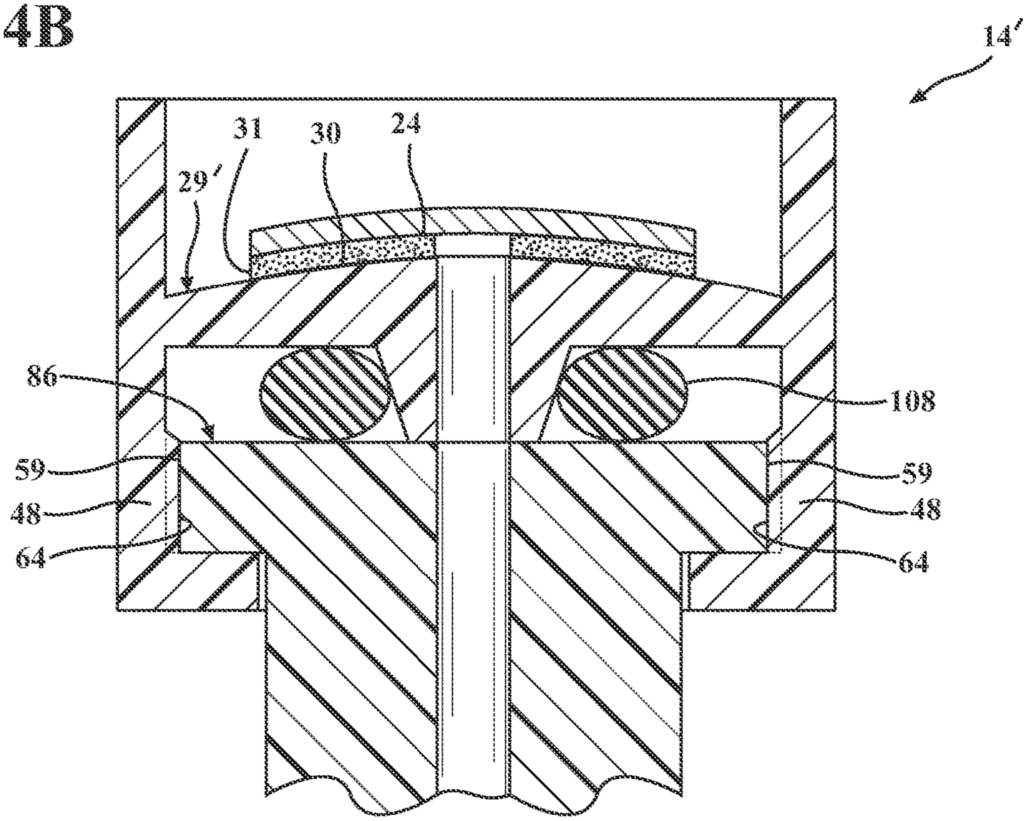
FIG. 4B is a view similar to FIG. 4A of a valve member of a diagnostic cartridge constructed in accordance with one aspect of the disclosure.

The valve member 14 further includes the first vent 30 attached thereto. As shown in FIG. 2, the first vent 30 is fixed to the upper surface 29 via the annular adhesive film 29, such that the annular adhesive film extends about, but does not cover, the inlet 26 and outlet 28. Further, the upper surface 29 can have a groove or channel 68 formed therein, with the channel 68 extending between the inlet 26 and outlet 28. As such, upon adhering the first vent 30 to the upper surface 29, the fluid passage 24 is established beneath the first vent 30, through the inlet 26, outlet 28 and channel 68. It is to be recognized that the channel 68 could be omitted, with the fluid passage 24 still be formed automatically beneath the first vent 30, wherein the force established by the fluid 18 will automatically bias the first vent 30 slightly outwardly to flow from the inlet 26 to the outlet 28 beneath the first vent 30 through the fluid passage 24. This is made possible, at least in part, as a result of the annular adhesive film 31 bonding the outer periphery of the first vent 30 to the upper surface 29. The upper surface 29 can be formed flat, such as shown in FIG. 4A, or, as shown in FIG. 4B, an alternate embodiment of a valve member 14' can have an upper surface 29' formed as a convex surface. The convex upper surface 29' facilitates application of the first vent 30 to the upper surface 29' by allowing the first vent 30 to be reliably stretched taught while being adhered or otherwise fixed to the upper surface 29', thereby avoiding wrinkles from being formed therein. Accordingly, the volume of the fluid passage 24 is tightly controlled.

The blister 16 can be provided as discussed above and subsequent fixed to the body 12, such as via an adhesive film 70, by way of example and without limitation. The body 12 can be formed having an upstanding peripheral wall or lip 72 to delineate the precise location for attachment of the blister 16 to the body 12. The adhesive strip 70 can also be patterned to match the shape of the outer periphery of the blister bottom surface 42, and is preferably provided having dual adhesive sides for ready adhesion to the bottom surface 42 and the body 12. Further, the adhesive film 70 can be provided with a through opening 74 located for alignment with an inlet 76 of a fluid port 78 extending to the outlet 33 that is configured for selective fluid communication with the inlet 26 and outlet 28 of the valve member 14. It is to be recognized that the opening mechanism 46 discussed above with regard to forming the opening in the bottom surface 42 of the blister 16 could also be configured to form an opening through the adhesive film 70, if desired.

The fluid chamber 20 can be provided as a predetermined length of capillary tubing sized for receipt within a pre-formed passage 80 in the body 12. The capillary tubing can be fixed within the passage 80 is any desired fashion, though a preferred mechanism can include using a suitable fluid adhesive disposed about at least a portion of an outer surface of the capillary tubing, as discussed further below. The fluid chamber 20 has an inlet 82 and an outlet 84, wherein the inlet 82 is configured to extend in flush relation with an outer periphery slide surface 86 of the body 12 along which the valve member 14 slides and the outlet 84 is configured for receipt within an inlet region 88 of the analysis chamber 22.

The analysis chamber 22 can be molded as a plastic body 89 having a pair of spring features or tabs 90 configured for snapping attachment to the body 12. The analysis chamber 22—can be formed having the spring tabs molded integrally therewith. The spring tabs 90 are configured for snapping receipt within corresponding openings or slots 92 molded integrally in the body 12. As best shown in FIG. 2, the analysis chamber 22 can be molded having a recessed pocket 94 that is subsequently covered and sealed off by a cover forming the window 34 of the analysis chamber 22. The window 34 can be bonded to the body 89 via a double-sided adhesive layer 96. The adhesive layer 96 can be formed having a first opening 98 sized similarly as the recess pocket 94 for alignment therewith, thereby avoiding any interference with the ability to clearly observe the sample S through the window 34. Further, the adhesive layer 96 can have a second opening 100 configured to register with an opening 102 in the window 34 and with an opening 104 in the body 89, wherein the opening 104 extends into the inlet region 88 to allow for the introduction of a suitable fluid adhesive to be disposed about an end region of the capillary sample chamber 20. Accordingly, prior to inserting the capillary sample chamber 20 into the passage 80 in the body 12, the window 34 can be bonded to the body 89, and the subassembly of the analysis chamber 22 can be attached to the body 12 via the spring tabs 90. Then, the capillary sample chamber 20 can be inserted into the passage 80 to bring the inlet 82 into flush relation with the slide surface 86, whereupon the outlet 84 is disposed into the inlet region 88 of the body 89. Then, a fluid adhesive can be disposed about an end region of the capillary sample chamber via the aligned openings 100, 102, 104. To facilitate proper alignment of the openings 100, 102, 104, a jig fixture can be used having locating pins for receipt within fixture openings 105, 107, 109 of the window 34, adhesive layer 96 and body 89, respectively. It will be recognized that the fluid adhesive can flow at least partially about the capillary sample chamber 20 adjacent the outlet 84 to bond the capillary sample chamber 20 to the body 89 without closing off or other blocking the flow of the sample S outwardly through the outlet 84.

In use, and with the valve member 14 in the first unactuated, closed priming state (FIGS. 3A-3C), the blister 16 is selectively opened via pressing the region of the opening mechanism 46 (FIG. 3A), whereupon the fluid 18 contained within the blister 16 can be freely dispensed therefrom through the valve outlet 28 by pressing the bulbous region of the blister 16 (FIG. 3B) to completely fill the fluid passage 24. The valve outlet 28 is sealed against the slide surface 86 of the body 12 in a fluid-tight seal therewith via an annular seal ring 108, such as a rubber O-ring, by way of example without limitation. As such, the fluid 18 freely flows into the outlet 28 without leaking. As the fluid 18 fills the fluid passage 24, any air within the fluid passage 24 is evacuated therefrom through the first vent 30 in the direction of arrows A. Only a predetermined amount of the fluid 18 can enter the fluid passage 24, as the inlet 26 is sealed off in a fluid-tight seal against the slide surface 86 via an annular seal ring 106, such as a rubber O-ring, by way of example without limitation. Accordingly, the fluid 18 is prevented from exiting the inlet 26 while the valve member 14 is in the closed, priming state. Thus, upon the filling capacity of the fluid passage 24, no additional fluid can be dispensed from the blister 16.

Figure 3C:
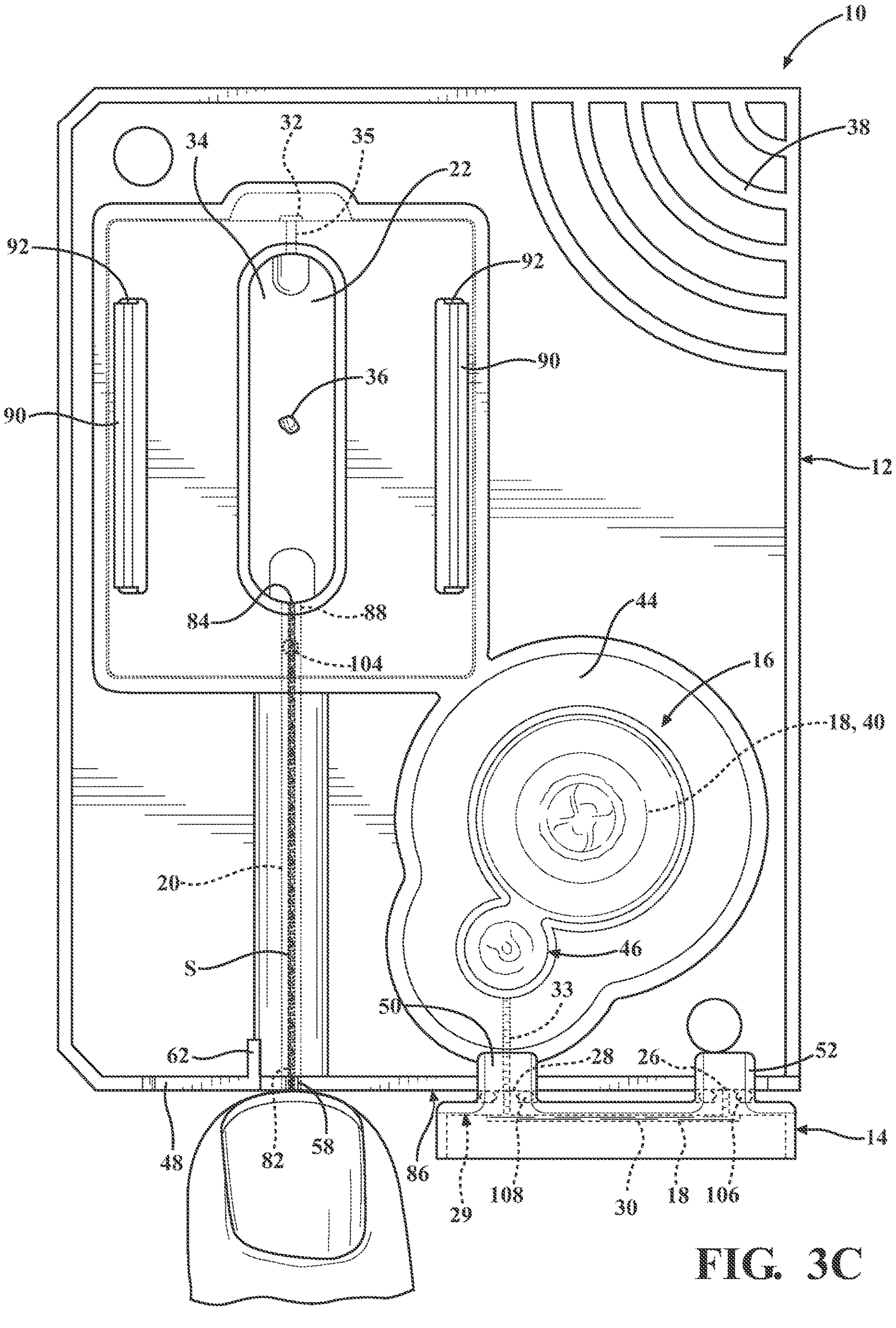
FIG. 3C illustrates a fluid sample being introduced into a sample receiving chamber of the diagnostic cartridge.
Figure 3D:
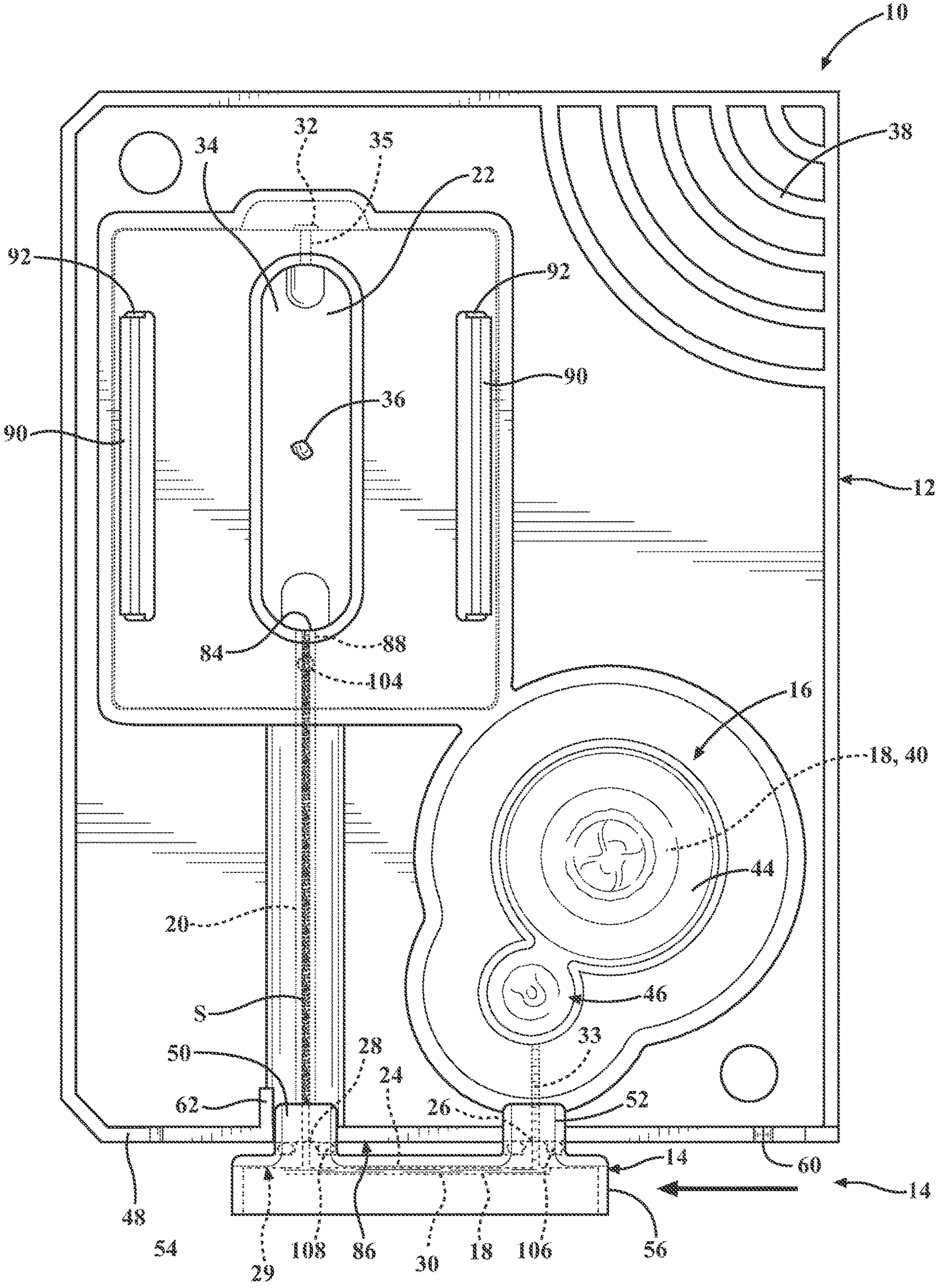
FIG. 3D is view similar to FIG. 3B, with the valve member, having been primed with fluid from the fluid-containing blister, translated to an actuated, second state.
Figure 3E:
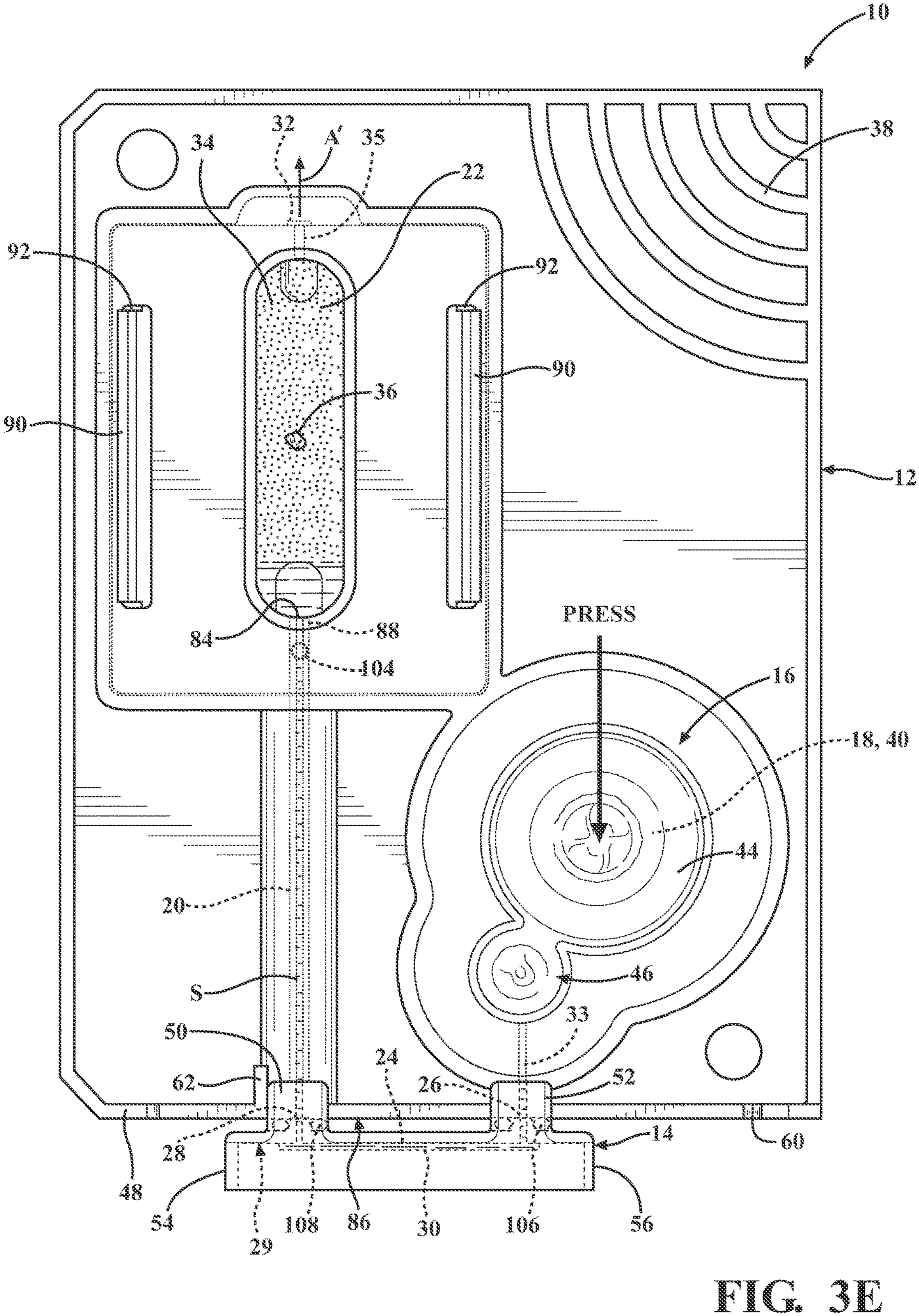
FIG. 3E is a view similar to FIG. 3D, with the fluid sample being urged into a detection/analysis chamber of the diagnostic cartridge via selectively pressurized flow of the fluid from the fluid-containing blister.
Figure 3F:
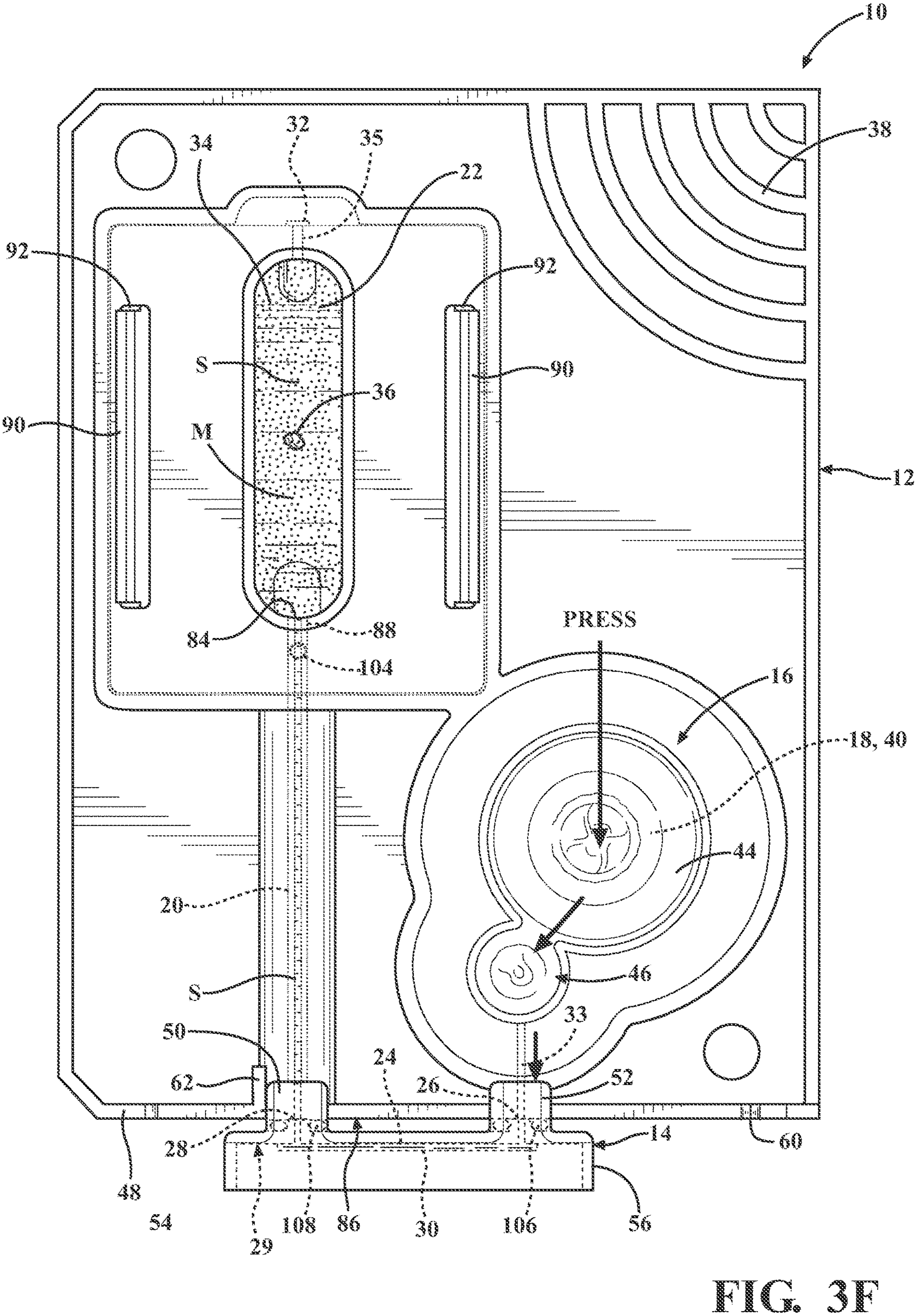
FIG. 3F is a view similar to FIG. 3E, with the fluid sample and the fluid from the fluid-containing blister shown homogenously mixed within the detection/analysis chamber.

Then, upon completely filling the fluid passage 24 to establish a precise priming volume of the fluid 18 therein, a sample S, such as a droplet of blood, for example, can be disposed into the sample chamber 20 under capillary action to completely fill the sample chamber 20 (FIG. 3C). It will be appreciated by those skilled in the art of capillary tubes that a precise meniscus is formed at the outlet 84 of the sample chamber 20, while a similar meniscus is formed at the inlet 82.

Then, upon disposing the sample S into the sample chamber 20, the valve member 14 is slidably actuated to the second actuated open state (FIG. 3D). As the valve member 14 is slidably translated to the open state, the outlet 28 of the fluid passage 24 is brought into fluid communication with the sample chamber 20 and the inlet 26 is brought into fluid communication with the blister 16. In addition, as the seal member 108 slides along the slide surface 86, the seal member 108 shears or cleaves the meniscus of the sample S formed at the inlet 82. Accordingly, a precise volume of the sample S is established with the sample chamber 20.

Then, with the valve member 14 in the second state, the precise volume of the priming volume of fluid 18 within the fluid passage 24, free of any air, is readily displaced under fluid pressure via further actuation of the blister 16 (FIG. 3E), whereupon the priming volume of fluid 18 pushes the fluid sample S under pressure to the analysis chamber 22 for analysis. As the fluid 18 and the sample S enter the analysis chamber 22, gas downstream from the mixture is vented outwardly through the second vent 32 along the direction of arrow A'. Upon being disposed into the sample chamber 20, the fluid 18 and sample S mixture are mixed via the mixing member 36 to form the homogenous mixture M of the fluid 18 and sample S (FIG. 3F). Then, the mixture M and sample S therein are analyzed for the specific factors desired.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A method of performing a diagnostic test on a fluid sample via a disposable diagnostic cartridge, comprising:
- introducing a sample into a sample receiving chamber of the disposable diagnostic cartridge;
- rupturing a fluid-containing blister of the disposable diagnostic cartridge;
- urging fluid to flow from the fluid-containing blister into a fluid passage of a translatable valve member while the translatable valve member is in a first state and causing air to evacuate the fluid passage;
- translating the valve member to a second state and bringing the fluid within the fluid passage into fluid communication with the sample; and
- urging the fluid within the fluid passage to transport the sample to an analysis chamber of the disposable diagnostic cartridge.

2. The method of claim 1, further including automatically forming a controlled volume meniscus of the sample at a sample outlet of the sample receiving chamber upon introducing the sample into the sample receiving chamber.

3. The method of claim 1, further including translating the valve member linearly from the first state to the second state along an outer periphery of the disposable diagnostic cartridge.

4. The method of claim 1, further including filling the fluid passage of the translatable valve member entirely with the fluid from the fluid-containing blister prior to translating the valve member to the second state.

5. The method of claim 4, further including venting any air from the fluid passage of the valve member prior to translating the valve member to the second state.

* * * * *